United States Patent [19]

Obermayer

[11] Patent Number: 4,948,478

[45] Date of Patent: Aug. 14, 1990

[54] URANIUM ISOTOPE SEPARATION PROCESS FOLLOWING THE MOLECULAR LASER PROCESS

[75] Inventor: Alexander Obermayer, Koln-Porz, Fed. Rep. of Germany

[73] Assignee: Uranit GmbH, Jülich, Fed. Rep. of Germany

[21] Appl. No.: 353,495

[22] Filed: May 18, 1989

[30] Foreign Application Priority Data

May 20, 1988 [DE] Fed. Rep. of Germany ....... 3817173

[51] Int. Cl.$^5$ .............................................. B01D 59/34
[52] U.S. Cl. ................... 204/157.22; 423/19; 423/253; 423/258
[58] Field of Search ................... 204/187.22; 423/253, 423/258, 19

[56] References Cited

U.S. PATENT DOCUMENTS

| | | | |
|---|---|---|---|
| 4,179,272 | 12/1979 | Kivel | 204/157.1 R |
| 4,212,716 | 7/1980 | Rigny | 204/157.1 R |
| 4,289,592 | 9/1981 | Tanner et al. | 204/157.1 R |
| 4,342,727 | 8/1982 | Tanner et al. | 423/3 |
| 4,734,177 | 3/1988 | Robinson et al. | 204/157.2 |

OTHER PUBLICATIONS

M. Bohine, et al., J. Inorg. Nucl. Chem., 32, pp. 1397-1400 (1970).
M. Bohine, et al., J. Inorg. Nucl. Chem., 34, pp. 2938-2941 (1972).
M. Bohine, et al., J. Inorg. Nucl. Chem., 34, pp. 2942-2946 (1972).

Primary Examiner—Edward A. Miller
Assistant Examiner—Ngoclan Mai
Attorney, Agent, or Firm—Spencer & Frank

[57] ABSTRACT

The process of the present invention provides a gas steam of a mixture of $UF_6$ isotopes and an inert gas, e.g. nitrogen, which is adiabatically expanded through a nozzle into a laser light excitation zone and photodissociated to form U-235 enriched $UF_5$.

After the gas stream has passed through the laser light excitation zone, $XeF_6$ is fed into the process gas stream so the the xenon hexafluoride remains protected against the dissociating radiation. The $XeF_6$ may be mixed with the same inert gas that is employed for the adiabatic cooling of the $UF_6$. The $XeF_6$ reaction with U-235 enriched $UF_5$ produces a stable complex of $UXeF_{11}$, which polymerizes to poly(pentafluoroxenonium(+1)-hexafluorouranate V), an intermediate product of the present process. The intermediate product may be thermally decomposed to form U-235 enriched $UF_6$ or U-235 enriched $\beta$-$UF_5$.

10 Claims, No Drawings

URANIUM ISOTOPE SEPARATION PROCESS FOLLOWING THE MOLECULAR LASER PROCESS

CROSS-REFERENCE TO RELATED APPLICATION

This application is related to the subject matter disclosed in Application No. P 38 17 173.2 filed May 20th, 1988 in the Federal Republic of Germany, the entire disclosure of which is incorporated herein by reference.

FIELD OF THE INVENTION

The present invention relates to an improvement of the molecular laser process for uranium enrichment.

TECHNOLOGY REVIEW

In the molecular laser process for uranium enrichment uranium hexafluoride gas, composed of an isotope mixture of $^{235}UF_6$ and $^{238}UF_6$, is diluted in an inert gas and cooled by adiabatic supersonic expansion. The cooled isotope gas mixture is selectively excited by irradiation with laser light of one or a plurality of infrared wavelengths $\lambda_a$ and is dissociated by simultaneous or subsequent exposure to one or further laser wavelengths $\lambda_d$ in the infrared or ultraviolet spectral range (Equations 1a and 1b), See AIChE Symposium Series No. 221, Vol. 78, pages 61–70 (1982).

$$^{235}UF_6 \xrightarrow{h\nu a}{k_1} {}^{235}UF^*_6 \xrightarrow{h\nu d} {}^{235}UF_5 + F \quad (1a)$$

$$^{238}UF_6 \xrightarrow{h\nu a}{k_{1'}} {}^{238}UF^*_6 \xrightarrow{h\nu d} {}^{238}UF_5 + F \quad (1b)$$

The U-235 enriched primary dissociation product ($UF_5$ monomers) polymerizes at temperatures below 100° C. into a crystalline solid body ($\beta$-$UF_5$) as the secondary product (Equations 2a and 2b), which can be separated from the circulating gas by subsequent physical separation processes such as filtration or the like.

$$2 UF_5 \rightarrow (UF_5)_2 \quad (2a)$$

$$2 UF_5 \longrightarrow (UF_5)_2 \quad (2a)$$

$$(UF_5)_n + (UF_5)_m \xrightarrow{k_2} (UF_5)_{m+n} \downarrow \quad (2b)$$

where $n \geq 2$

From the publications by J. Lyman et al, J. Phys. Chem. 91 pages 4821–4827 (1987), and G. Grigor'ev et al., J. Sov. Chem. Phys. 3 (10), pages 2275–2281 (1986), it is known that $UF_5$ particles, particularly $UF_5$ monomers, are quickly fluorinated by fluorine atoms (Equations 3 and 4) to $UF_6$ (Equation 5 and 6). See also German Patent No. 2,651,122 and U.S. Pat. No. 4,212,716.

Equation 3:
Reverse reaction of the $UF_5$ monomer primary product from the photochemical $UF_6$ dissociation $$^{235}UF_5 + F \xrightarrow{k_3} {}^{235}UF_6$$

Equation 4:
Reverse reaction of the $UF_5$ oligomer and polymer secondary product $$^{235}(UF_5)_n + F \xrightarrow{k_{3'}} {}^{235}UF_6 + {}^{235}(UF_5)_{n-1}$$

Equation 5:
(Formal) isotope exchange of the primary product by $UF_6$ molecules in the gas phase $$^{235}UF_5 + {}^{238}UF_6 \xrightarrow{k_4} {}^{235}UF_6 + {}^{238}UF_5$$

Equation 6:
Isotope exchange between the secondary product and $UF_6$ in the gas phase $$^{235}(UF_5)_n + {}^{238}UF_6 \xrightarrow{k_{4'}} {}^{235}(UF_5)_{n-1} \cdot {}^{238}UF_5 + {}^{235}UF_6$$

Equation 7:
Adsorption of $UF_6$ at $UF_5$ monomers $$UF_5 + {}^{238}UF_6 \xrightarrow{k_5} UF_5 \cdot {}^{238}UF_6$$

Equation 8:
Adsorption of $UF_6$ at the (growing) $UF_5$ polymer $$(UF_5)_n + {}^{238}UF_6 \xrightarrow{k_{5'}} (UF_5)_n \cdot {}^{238}UF_6$$

where $k_3 > k_{3'}$ and $k_4 > k_{4'}$ where $k_3 > K_{3'}$ and $k_4 > k_{4'}$.

As early as 1970 it was found that xenon hexafluoride reacts with solid crystalline $UF_5$ (produced by controlled fluorination of $UF_4$ with elemental fluorine) to form a new, stable chemical compound, polypentafluoroxenonium(+1) hexafluorouranate V $(XeF_5^+ UF_6^-)_n$, see M. Bohinc, et al., J. Inorg. Nucl. Chem., 32, pages 1397–1400 (1970); M. Bohinc et al., J. Inorg. Nucl. Chem., 34, pages 2942–2946 (1972), M. Bohinc, et al., J. Inorg. Nucl. Chem., 34, pages 2938–2941 (1972). These publications characterize this compound crystallographically and physically as well as chemically. However, the above-described method of forming and separating $UF_5$ solids (equations 1a, 1b, 2a and 2b) has considerable drawbacks. Due to the possibility of parallel and reverse reactions of the photochemical dissociation product $UF_5$ (Equations 3 to 6) and of adsorption effects (Equations 7 to 8), the degree of enrichment achieved at the beginning of the process and rate of production of $UF_5$ monomers produced at the beginning of the process cannot be maintained.

SUMMARY OF THE INVENTION

The present invention provides an improved uranium isotope separation process following the molecular laser process in which uranium hexafluoride composed of an isotopic mixture of $^{235}UF_6$ and $^{238}UF_6$ is diluted in an inert gas and cooled by adiabatic expansion. The cooled isotopic mixture is selectively excited by irradiation with laser light of one or a plurality of infrared wavelengths and is photodissociated by simultaneous or subsequent exposure to laser light of another infrared wavelength or an ultraviolet wavelength to form a dissociation product. The dissociation product U-235 enriched $UF_5$, which may form $UF_5$ oligomer, still present in the gas phase, is brought into contact with gaseous xenon hexafluoride, causing it to react chemically and form a U-235 enriched complex compound $UXeF_{11}$. Subsequently $UXeF_{11}$ polymerizes to form a crystalline solid of poly(pentafluoroxenonium(+1)-hexafluorouranate V), an intermediate product which may then be separated from the gas mixture. The intermediate product may be thermally decomposed to form U-235 enriched $UF_6$ or U-235 enriched $\beta\text{-}UF_5$.

It is an object of the present invention to improve the selectivity in molecular laser processes for uranium enrichment.

It is another object of the present invention to improve the yield in molecular laser processes for uranium enrichment.

DETAILED DESCRIPTION OF THE INVENTION

The present invention is based on the discovery that the U-235 enriched UF5 monomers, and U-235 enriched UF5 oligomers present in the gas phase, which are primary products of the photochemical $UF_6$ dissociation, also react chemically with xenon hexafluoride to form a stable complex molecule which quickly polymerize to form a crystalline solid of poly(pentafluoroxenonium(+1)-hexafluorouranate V) (Equations 9 to 11). The $XeF_6$ reaction with $UF_5$ occurs faster than reactions of the $UF_5$ particles fluorine atoms or with $UF_6$ molecules.

It is an important aspect of the present invention that the $UF_5$-$XeF_6$ reaction is utilized advantageously to form solid particles of poly(pentafluoroxenonium(+1)-hexafluorouranate V) in the molecular laser uranium enrichment process. In the present invention it has been found that if the appropriate amount of $XeF_6$ is added to the irradiated process gas stream, preferably immediately downstream of the laser light excitation step, stable complex molecules of $UXeF_{11}$ are formed which noticeably suppress selectivity reducing and yield reducing secondary reactions affecting the $UF_5$ monomers and at the growing $UF_5$ oligomers, respectively. See Equations 3 to 8. Thus the degree of enrichment, that is the selectivity, achieved at the beginning of the process is maintained, and the rate of production of U-235 enriched uranium produced by the process is maintained to a substantial degree as the process of the present invention continues, even after the formation of solid particles of poly(pentafluoroxenonium(+1)-hexafluorouranate V), which is an intermediate product of the present process.

The solid intermediate product produced by this process can then also be separated from the circulating gas by means of suitable physical separation processes, e.g. by filtration.

Equation 9:
Monomer reaction between $XeF_6$ and $UF_5$

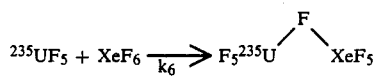

Equation 10:
Reaction between $XeF_6$ and $UF_5$ oligomers

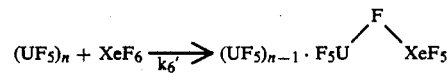

Equation 11:
Polymerization of the complex monomer from $UF_5$ and $XeF_6$ to form the solid body

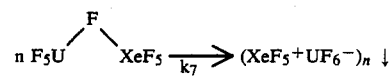

where $k_6 > k_3$, $k_4$ and $k_6' > k_3'$, $k_4'$ where $k_6 > k_3$, $k_4$ and $k'_6 > k'_3$, $k'_4$ The isolated solid intermediate product can then either be reconverted to uranium hexafluoride by heating in a closed vacuum system (Equation 12a) or can be decomposed in a reversal of its formation by heating it in an inert gas stream to yield $\beta\text{-}UF_5$ and $XeF_6$ (Equation 12b), see M. Bohinc, et al., J. Inorg. Nucl. Chem., 34 pages 2938–2941 (1972).

Thermal decomposition of $UXeF_{11}$:

Thermal decomposition of $UXeF_{11}$:

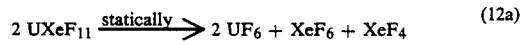 (12a)

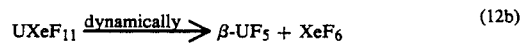 (12b)

The $XeF_4$ produced in the statically thermal decomposition (Equation 12a) may be reacted with elemental fluorine to form additional $XeF_6$. The $XeF_4$, $XeF_6$ and any additional $XeF_6$ may be recovered by fractionated condensation.

The latter decomposition has the advantage that it permits the (very expensive) xenon hexafluoride to be continuously recovered quantitatively and returned to the process; additionally, this reversible pyrolysis produces extremely pure enriched $\beta\text{-}UF_5$, see M. Bohinc, et al., J. Inorg. Nucl. Chem., 34 pages 2938–2941 (1972).

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A uranium isotope separation process, comprising:
   diluting gaseous uranium hexafluoride composed of an isotopic mixture of $^{235}UF_6$ and $^{238}UF_6$ with an inert gas,
   cooling said diluted isotopic mixture by adiabatic expansion,
   selectively exciting said cooled isotopic mixture by irradiation with laser light of at least one infrared wavelength,
   photodissociating said excited isotopic mixture by simultaneous or subsequent exposure to laser light of another infrared wavelength or an ultraviolet wavelength, to produce a gas phase dissociation product selected from the group consisting of $UF_5$, an oligomer of $UF_5$, and mixtures thereof, reacting said gas phase dissociation product with gaseous xenon hexafluoride to form a $UXeF_{11}$ complex compound, polymerizing said $UXeF_{11}$ to form a solid of poly(pentafluoroxenonium(+1)-hexafluorouranate V), and separating said solid poly(pentafluoroxenonium(+1)-hexafluorouranate V).

2. The process defined in claim 1, wherein the gaseous xenon hexafluoride is diluted with an inert gas.

3. The process defined in claim 2, wherein the gaseous uranium hexafloride is diluted with the same inert gas.

4. The process defined in claim 2, wherein the diluted gaseous $XeF_6$, with respect to the direction of flow of the $UF_6$, is fed in immediately downstream of the laser light excitation step.

5. The poly(pentafluoroxenonium(+1)-hexafluorouranate V) process defined in claim 1, including decomposing the poly(pentafluoroxenonium(+1)-hexafluorouranate V) by irreversible thermal decomposition in a closed vacuum system to form enriched $UF_6$.

6. The process defined in claim 5, wherein the irreversible thermal decomposition of poly(pentafluoroxenonium(+1)-hexafluorouranate V) forms xenon hexafluoride and xenon tetrafluoride.

7. The process defined in claim 6 wherein the xenon hexafluoride and xenon tetrafluoride are recovered from the process gas stream together with excess xenon hexafluoride by fractionated condensation of the gas phase $XeF_4/UF_6/XeF_6$/inert gas.

8. The process defined in claim 6, including reacting the xenon tetrafluoride by fluoridation with elemental fluorine to form xenon hexafluoride.

9. The process defined in claim 1, including forming enriched $\beta$-$UF_5$ and $XeF_6$ by means of reversible thermal decomposition of poly(pentafluoroxenonium(+1)-hexafluorourante V) in a stream of inert gas.

10. The process defined in claim 9, including separating said $XeF_6$ and reacting said separated $XeF_6$ with additional gas phase dissociation product of said photodissociation.

* * * * *